United States Patent
Lin et al.

(10) Patent No.: US 11,516,212 B2
(45) Date of Patent: Nov. 29, 2022

(54) MULTI-FUNCTIONAL AUTHENTICATION APPARATUS AND OPERATING METHOD FOR THE SAME

(71) Applicant: AUTHENTREND TECHNOLOGY INC., Taipei (TW)

(72) Inventors: Jhih-You Lin, Taipei (TW); Chi-Feng Huang, Taipei (TW)

(73) Assignee: AUTHENTREND TECHNOLOGY INC., Taipei (TW)

( * ) Notice: Subject to any disclaimer, the term of this patent is extended or adjusted under 35 U.S.C. 154(b) by 839 days.

(21) Appl. No.: 16/411,563

(22) Filed: May 14, 2019

(65) Prior Publication Data

US 2020/0162455 A1    May 21, 2020

(30) Foreign Application Priority Data

Nov. 19, 2018    (TW) .................................. 107141050

(51) Int. Cl.
*H04L 29/06*    (2006.01)
*H04L 9/40*    (2022.01)
(Continued)

(52) U.S. Cl.
CPC ........ *H04L 63/0853* (2013.01); *G06F 1/3243* (2013.01); *G06Q 20/325* (2013.01);
(Continued)

(58) Field of Classification Search
None
See application file for complete search history.

(56) References Cited

U.S. PATENT DOCUMENTS 11,442,751 B2 *    9/2022    Yan ...................... G06N 20/00
2002/0016913 A1 *    2/2002    Wheeler .............. H04L 9/3247
713/181
(Continued)

FOREIGN PATENT DOCUMENTS

| CN | 104506910 A | 4/2015 |
|----|-------------|--------|
| TW | I541655 B | 7/2016 |

(Continued)

*Primary Examiner* — Piotr Poltorak
(74) *Attorney, Agent, or Firm* — Li & Cai Intellectual Property (USA) Office

(57) ABSTRACT

A multi-functional authentication apparatus and an operation method for the same are provided. The multi-functional authentication apparatus integrates multiple communication modules into one device. A biometric authentication procedure is firstly performed when activating this multi-functional authentication apparatus. A security code is generated through a security authentication mechanism provided by this apparatus after reading biometric features. After that, according to a connection protocol, one of the communication modules of the multi-functional authentication apparatus is activated to connect with an external host. The security code is transmitted to the host via the communication module for identifying a user. The multi-functional authentication apparatus acts as an authenticator that allows a user to login to a computer system or obtain a network service after authentication. The multi-functional authentication apparatus also provides authentication for the user to open an access control device or conduct a mobile payment.

18 Claims, 8 Drawing Sheets

(51) Int. Cl.
*G06F 1/3234* (2019.01)
*G06Q 20/32* (2012.01)
*H04W 4/80* (2018.01)

(52) U.S. Cl.
CPC ........ *H04L 63/0861* (2013.01); *H04L 63/102*
(2013.01); *H04W 4/80* (2018.02); *H04L*
*2463/082* (2013.01)

(56) References Cited

U.S. PATENT DOCUMENTS

| | | | |
|---|---|---|---|
| 2003/0028781 A1* | 2/2003 | Strongin | G06F 9/24 712/E9.007 |
| 2007/0030495 A1* | 2/2007 | Ohishi | H04N 1/00941 358/1.6 |
| 2007/0040017 A1* | 2/2007 | Kozlay | H04L 63/0861 235/441 |
| 2007/0171877 A1* | 7/2007 | Hasegawa | G06F 13/385 370/338 |
| 2007/0220273 A1* | 9/2007 | Campisi | G06Q 20/3574 713/186 |
| 2007/0257105 A1* | 11/2007 | Owen | G06F 21/32 235/382 |
| 2008/0209079 A1* | 8/2008 | Caswell | G06F 13/387 710/13 |
| 2008/0296074 A1* | 12/2008 | Hollstron | G06F 3/038 178/19.01 |
| 2009/0129262 A1* | 5/2009 | Honma | H04J 3/14 370/389 |
| 2009/0258649 A1* | 10/2009 | Salowey | H04W 52/0258 455/435.2 |
| 2011/0021142 A1* | 1/2011 | Desai | H04W 4/80 455/41.2 |
| 2013/0040574 A1* | 2/2013 | Hillyard | H04W 8/005 455/41.2 |
| 2013/0142330 A1* | 6/2013 | Schultz | H04N 21/8352 380/210 |
| 2013/0166928 A1* | 6/2013 | Yang | G06F 1/3212 713/300 |
| 2013/0312062 A1 | 11/2013 | Kuwabara | |
| 2013/0339748 A1* | 12/2013 | Stinson, III | G06F 21/34 713/186 |
| 2014/0295754 A1 | 10/2014 | Lortz et al. | |
| 2014/0329497 A1* | 11/2014 | Sanzgiri | H04M 1/72412 455/26.1 |
| 2016/0065554 A1* | 3/2016 | Brown | H04L 63/20 726/1 |
| 2017/0010674 A1* | 1/2017 | Ide | H04W 12/065 |
| 2017/0083750 A1 | 3/2017 | Chin et al. | |
| 2018/0048471 A1 | 2/2018 | Yasaki et al. | |
| 2020/0329031 A1* | 10/2020 | Hashimoto | H04W 12/30 |
| 2021/0256102 A1* | 8/2021 | Luft | H04L 63/045 |

FOREIGN PATENT DOCUMENTS

| | | |
|---|---|---|
| TW | 201712603 A | 4/2017 |
| TW | M569453 U | 11/2018 |

\* cited by examiner

MULTI-FUNCTIONAL AUTHENTICATION APPARATUS AND OPERATING METHOD FOR THE SAME

CROSS-REFERENCE TO RELATED PATENT APPLICATION

This application claims the benefit of priority to Taiwan Patent Application No. 107141050, filed on Nov. 19, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is related to an authentication apparatus, and in particular to a multi-functional authentication apparatus that integrates multiple communication modules for performing various authentication procedures, and an operating method thereof.

BACKGROUND OF THE DISCLOSURE

Generally, an identity authentication technology using information related to accounts and passwords is adopted in an information system. The drawback of the conventional security mechanism is that the account and password rely on a user committing such information to memory, and that the security level of such information may not be high enough to protect user identity. Some biometric technologies such as fingerprint recognition, facial recognition such as 3D facial scanning, iris and finger vein recognition are available to conduct the identity authentication. However, since these authentication mechanisms require corresponding hardware and system setups, such biometric technologies are still not adopted on a universal scale.

Further, some modern identity authentication technologies are already incorporated in the mobile devices, wearable devices or devices for user identification. However, such identity authentication technologies also require corresponding hardware or systems, making it difficult to promote widespread application thereof.

Regardless of what specific purpose the above mentioned conventional security technologies is used for, such technologies are still not seeing widespread use in identify authentication for personalized devices such as mobile devices.

SUMMARY OF THE DISCLOSURE

In response to the above-referenced technical inadequacies, the present disclosure provides a multi-functional authentication apparatus and an operating method for the same.

The disclosure is related to a multi-functional authentication apparatus that is used to integrate multiple authentication technologies in one apparatus. An operating method is also provided in the multi-functional authentication apparatus for performing various authentication applications. The apparatus and the method can be adapted to various authentication uses. For example, when the multi-functional authentication apparatus connects with a host, it replaces the original login method and allows a user to log in a computer system simply with the apparatus. The multi-functional authentication apparatus may also be configured to execute a software process or access data. Further, the multi-functional authentication apparatus performs security authentication while connecting with an access control device. After passing the security authentication, the access control device can be successfully opened. Still further, the multi-functional authentication apparatus can act as an authentication apparatus for processing a payment procedure.

In the operating method of the present disclosure, a security authentication module of the multi-functional authentication apparatus is activated to perform a biometric authentication procedure so as to recognize biometric features. For example, the biometric feature is such as a fingerprint. After the multi-functional authentication apparatus verifies the biometric feature, a security code is generated. The security code becomes a certification for various applications. A connection protocol is provided for the multi-functional authentication apparatus to decide one of the plurality of communication modules to connect with a host. The multi-functional authentication apparatus transmits the security code to the host via the communication module for conducting identity authentication.

When the biometric feature is generated, a hash value with respect to the biometric feature is calculated by a hash function. The security authentication module then encrypts the hash value by an encryption algorithm using an encryption key, and a signature that acts as the security code is therefore generated.

One of the communication modules is a bus module, e.g. USB. The multi-functional authentication apparatus connects with the host via a data interface of the bus module. The data interface is used to transmit the security code when the security code is compiled into a specific format. The multi-functional authentication apparatus therefore becomes an authentication apparatus for logging on a computer system, accessing a network service or data.

One of the communication modules is a wireless communication module that is turned on or off according to the connection protocol. The multi-functional authentication apparatus is applicable to requirements for various situations.

In one aspect of the multi-functional authentication apparatus of the present disclosure, the main circuits of the multi-functional authentication apparatus include a microcontroller unit, multiple communication modules, a biometric module and a security authentication module. The communication modules allow the apparatus to conduct communication via a wired or wireless method. The communication modules are such as the bus module, a Bluetooth communication module and a Near-Field Communication module. The connection protocol determines the timing for activating or deactivating each of the communication modules.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
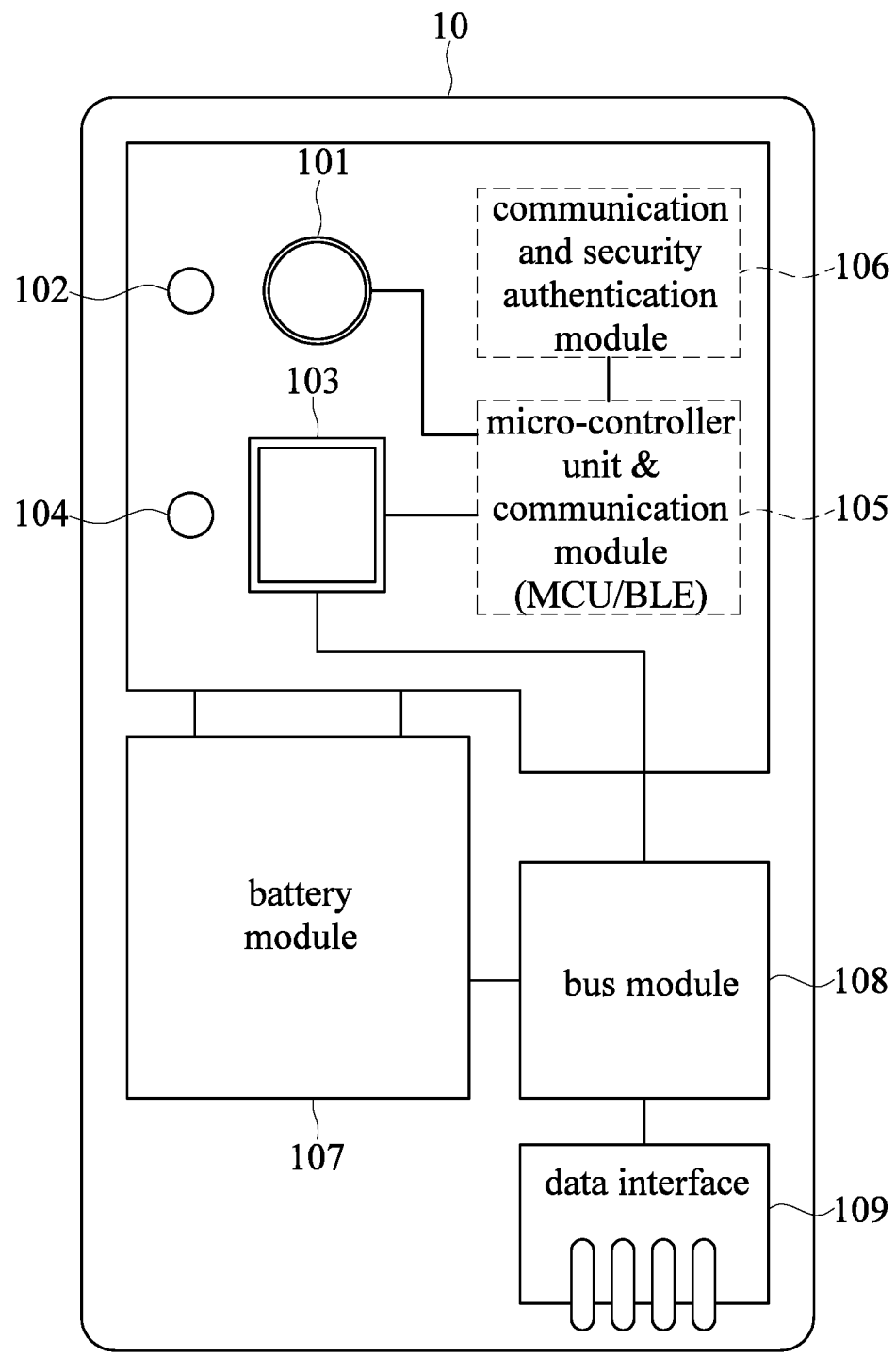
FIG. 1 is a schematic diagram depicting a fundamental framework of a multi-functional authentication apparatus in one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to a multi-functional authentication apparatus. A concept of design of the authentication apparatus is preferably an easy-to-carry device. In general, miniaturization is one of the goals for designing the multi-functional authentication apparatus. For example, the multi-functional authentication apparatus can be a card type or a bracelet type device. The multi-functional authentication apparatus integrates multiple authentication technologies. An operating method of the disclosure allows the multi-functional authentication apparatus to perform various authentication processes for various identity authentication purposes.

The multi-functional authentication apparatus is configured with a connection protocol that is used to make a decision of which communication module is used to connect with a host to be authenticated. The multi-functional authentication apparatus can operate various communication protocols and authentication processes based on the connection protocol. In an exemplary example, when the multi-functional authentication apparatus connects with a host via a data interface, a first wireless communication module of the apparatus is de-activated. After the multi-functional authentication apparatus is removed from the host, the first wireless communication module is activated to conduct the authentication process. When the first wireless communication module is de-activated, a second wireless communication module of the apparatus is activated to conduct the authentication process.

It is worth mentioning that, before the multi-functional authentication apparatus starts to function, the multi-functional authentication apparatus should first be initialized. For example, when the multi-functional authentication apparatus is plugged into a computer device via USB, the multi-functional authentication apparatus requires a user to register his biometric feature, e.g. fingerprint. The multi-functional authentication apparatus is also registered in the computer system where a corresponding software program is installed. The multi-functional authentication apparatus is used to substitute for an authentication method originally performed in the computer system. In the meantime, the software program assists the user to register the user's biometric feature into the multi-functional authentication apparatus. The multi-functional authentication apparatus also stores an encryption key (i.e. private key), and the encryption key is provided for a security algorithm to calculate a security code from the biometric feature by a security authentication module of the multi-functional authentication apparatus. The security code becomes an identity of the multi-functional authentication apparatus.

Thus, the computer system can obtain the security code from the multi-functional authentication apparatus, and the security code acts as a certification for logging on the computer system. The security code can also allow the computer system to access a network service via a web browser under a Fast ID Online (FIDO) mechanism. The related embodiments are as follows.

Reference is made to FIG. 1 shows a fundamental framework of a multi-functional authentication apparatus 10 according to one embodiment of the disclosure. While the present example shows a card-type multi-functional authentication apparatus 10, the appearance of the apparatus is not limited by the present disclosure.

A housing of the multi-functional authentication apparatus 10 includes a power switch 101 that is electrically connected with an internal power management circuit. The power switch 101 allows a user to activate/de-activate the multi-functional authentication apparatus 10 with a touch action. The housing has a power indicator light 102 that can be used to show a power state of the apparatus 10 with various light signals such as flashing, breathing and/or colors. The power state indicates statuses such as power-charging, voltage levels, switched on/off or low-voltage warnings of the apparatus 10. Other indicators can also be added for indicating diverse states of the apparatus 10. One of the indicators is an operation indicating light 104 that utilizes light signals to show an operating state of the apparatus 10. For example, since the multi-functional authentication apparatus 10 integrates various communication and authentication technologies, the operation indicating light 104 with flashing, breathing or color-changing lights can be in charge of indicating an operation of each of the communication modules of the apparatus 10, a process of authentication operated in the apparatus 10 or showing if the apparatus operates correctly.

The multi-functional authentication apparatus 10 includes a biometric feature access interface 103 that is connected with a biometric recognition circuit inside the multi-functional authentication apparatus 10. The biometric recognition circuit is exemplarily a fingerprint scanner or the like. One of the purposes of the biometric recognition circuit is to obtain a user's biometric feature, e.g. fingerprint, that is used to generate data such as a security code for the authentication process. The biometric feature allows the multi-functional authentication apparatus 10 to be applied for various authentication purposes.

The fingerprint, as an example, is obtained when the user's finger touches the biometric feature access interface 103. At this time, an indicator light can light up. For example, a green light lights up if the fingerprint is successfully read by the apparatus 10, and another light, e.g. a red light, lights up if the apparatus 10 fails to read the fingerprint.

The multi-functional authentication apparatus 10 is optionally an integrated circuit (i.e. IC) manufactured by a high-end process technology. The apparatus 10 integrates multiple communication circuits and protocols. In an exemplary example, the circuits integrated into the apparatus 10 include a micro-controller unit (MCU), a micro-controller for the communication circuits such as Bluetooth™ and Bluetooth Low Energy (BLE), a micro-controller unit and communication module 105, and a security chip that integrates a specific communication circuit, e.g. an NFC, and a communication and security authentication module 106 of the security chip.

It should be noted that each of the communication modules can be a communication circuit, supporting a specific communication protocol and essentially including baseband, ADC/DAC and RF circuits, and a corresponding antennas. As an example when activating the Bluetooth communication module, a related indicator light lights up and flashes for indicating that some connection packets are broadcasted and that the Bluetooth communication module awaits to be paired with another device. After being successfully paired with the device, an indicator light of the apparatus 10 is solid.

The multi-functional authentication apparatus 10 is preferably a portable device. The portable device may be powered by a connected external host that embodies the bus module 108 of the apparatus 10 via USB. The multi-functional authentication apparatus 10 also supports an authentication process with wireless communication and therefore has an independent power supply such as a battery module 107. The power management circuit (not shown) supplies power to the multi-functional authentication apparatus 10 by the battery module 107. The apparatus 10 can also receive external power via the bus module 108 and the data interface 109. It worth is mentioning that, under the design concept of miniaturization for the multi-functional authentication apparatus 10, the data interface 109 can be designed as a retractable structure. When the apparatus 10 links with a host via the bus module 108 and the data interface 109, the multi-functional authentication apparatus 10 is initiated as entering a charging mode or a data transmission mode.

In an exemplary example, when the multi-functional authentication apparatus 1 is under the charging mode when connecting with an external power supply via the data interface 109, an indicator light, e.g. a flashing light, is displayed. If the charging process is completed, the power management module instructs that the indicator light is turned off or in another lighting mode. If the multi-functional authentication apparatus 10 is at a low voltage state, a specific light lights up for warning that the battery is about to be exhausted.

Figure 2:
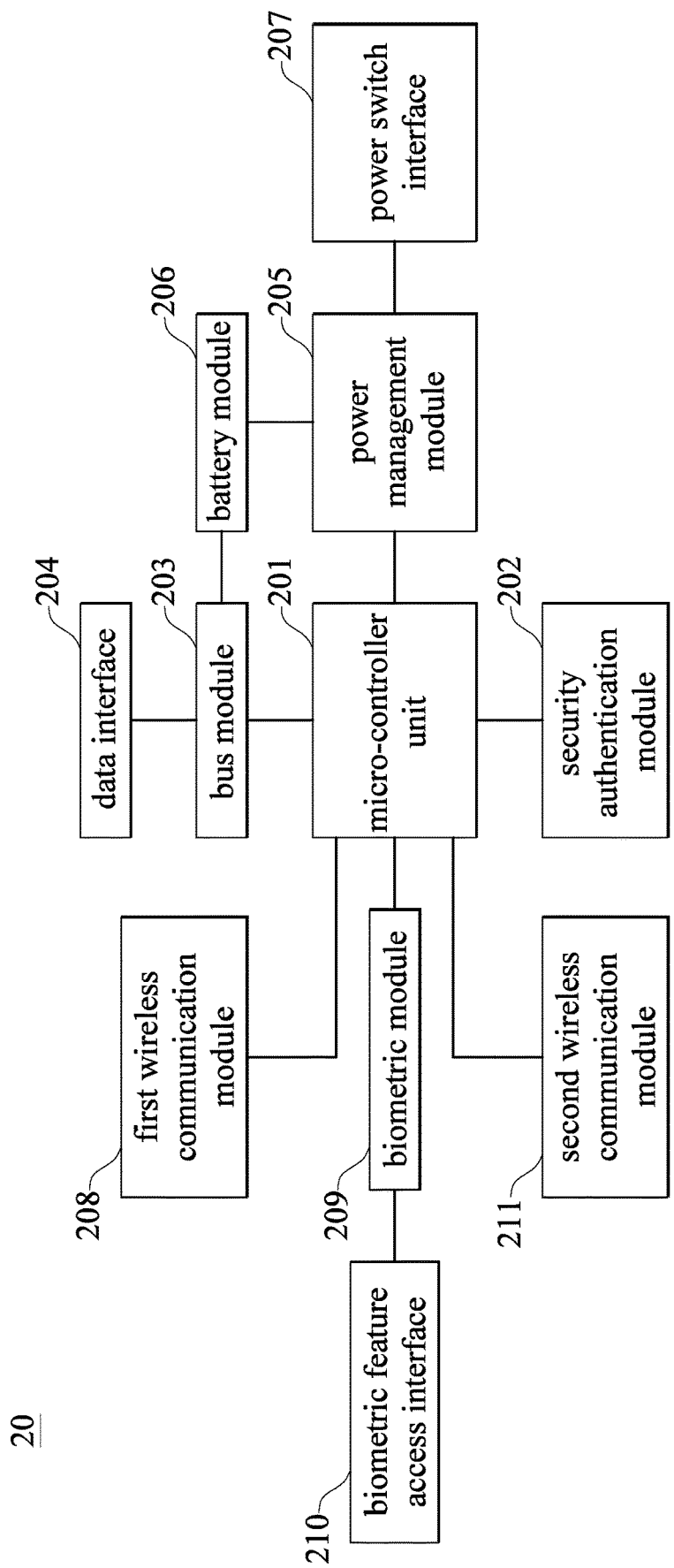
FIG. 2 is a circuit block diagram of the multi-functional authentication apparatus in one embodiment of the disclosure.

FIG. 2 shows a circuit block diagram of the multi-functional authentication apparatus in one embodiment of the present disclosure. The figure depicts main circuits of the multi-functional authentication apparatus 20. The circuits can be divided into different functional modules. In practice, part of the functional modules can be integrated into one circuit system or implemented by software that is cooperated with hardware.

The multi-functional authentication apparatus 20 can be a card-type device that is an independently-operated device. The internal battery module 206 supplies power to the multi-functional authentication apparatus 20 through the power management module 205. The power management module 205 is used to process the power supplies from the battery module 206 or an external power source in a wired or wireless charging method. The apparatus 10 provides a power switch interface 207 for the user to touch or click for activating or deactivating the apparatus 10. For differentiating the functions of the power switch interface 207 for turning on or off the communication modules, the multi-functional authentication apparatus 20 is turned off by pressing and holding the power switch interface 207 for a while.

A micro-controller unit 201 of the multi-functional authentication apparatus 20 is used to control operations of the circuit modules of the multi-functional authentication apparatus 20. The multi-functional authentication apparatus 20 includes a security authentication module 202 that is configured to be a secure element (SE), and can be implemented by a security chip. A specific communication circuit can be integrated into one security chip.

The multi-functional authentication apparatus 20 includes a biometric module 209 that is electrically connected with a micro-controller unit 201. A biometric feature access interface 210 of the multi-functional authentication apparatus 20 is used to read a biometric feature. Various biometric recognition technologies can be used in the apparatus 10. The security authentication module 202 is electrically connected with the micro-controller unit 201 for obtaining the biometric feature generated by the biometric module 209 by the micro-controller unit 201. In one embodiment of the disclosure, a hash algorithm is applied to the biometric feature for calculating a hash value or a digest. An encryption key stored in the security authentication module 202 is then retrieved. The encryption key is incorporated to the encryption algorithm for calculating the hash value so as to create a digital signature. The signature can act as the security code for authentication.

In one further embodiment of the disclosure, the security authentication module 202 includes a security chip that has a processor. Therefore, the security chip is able to verify biometric data, e.g. the security code, quickly. The security chip has a memory that can be used to store the encryption key and the data relating to the biometric feature for comparison. When the multi-functional authentication apparatus 20 is initiated to process authentication, the biometric feature can be obtained by the biometric module 209. The biometric feature is then compared with the data stored in the memory of the security chip. The security chip allows the multi-functional authentication apparatus 20 to conduct an initial identity authentication. In one embodiment, after obtaining the biometric feature, a hash value is calculated. The encryption key of the security authentication module 202 is used to create a signature based on the information such as host data, e.g. time and hardware information, and a certificate provided by a certificate authority (i.e. CA). The digital signature calculated by the hash algorithm is able to ensure source accuracy and content integrity. Therefore, a security code is generated. The security code is then transmitted to the host to which the apparatus 10 is connected. After decryption in the host, the authentication can be performed once the hash algorithm confirms the source accuracy and integrity of the biometric feature.

Further, multiple communication modules are included in the multi-functional authentication apparatus 20. Each of the communication modules is electrically connected with the micro-controller unit 201. The multi-functional authentication apparatus 20 integrates functions of the communication protocols and authentication processes. One of the communication modules is such as a bus module 203, e.g. USB, and a data interface 204, e.g. USB interface, is for linking an external device. The multi-functional authentication apparatus 20 uses the data interface 204 to plug in the host. The host is an electronic device such a computer host, an electronic device, or an access control device, requiring identity authentication.

The communication modules of the multi-functional authentication apparatus 20 may include more than one wireless communication module, e.g. a first wireless communication module 208 and a second wireless communication module 211. According to one of the embodiments, the first wireless communication module 208 is a Bluetooth communication module with Bluetooth™ technology, and the second wireless communication module 211 is a Near-Field communication module (i.e. NFC). The Bluetooth communication module can be a dual-mode communication chip that can operate under a Bluetooth communication protocol or a Bluetooth Low Energy (BLE) protocol.

The biometric module 209 can be a fingerprint recognition module that cooperates with the biometric feature access interface 210 disposed on a surface of the multi-functional authentication apparatus 20 for scanning a fingerprint image. The biometric feature can be extracted from the fingerprint image by the fingerprint recognition module. The security authentication module 202 accordingly generates the security code as shown in the above embodiments. The security code acts as a reference for identity authentication.

With reference to FIGS. 3 to 6, embodiments applying the multi-functional authentication apparatus according to the present disclosure are shown.

When the multi-functional authentication apparatus connects with a host, the apparatus replaces an original authentication process and is used to log in a computer system. The multi-functional authentication apparatus can be used for security authentication when executing a software program or accessing data.

Figure 3:
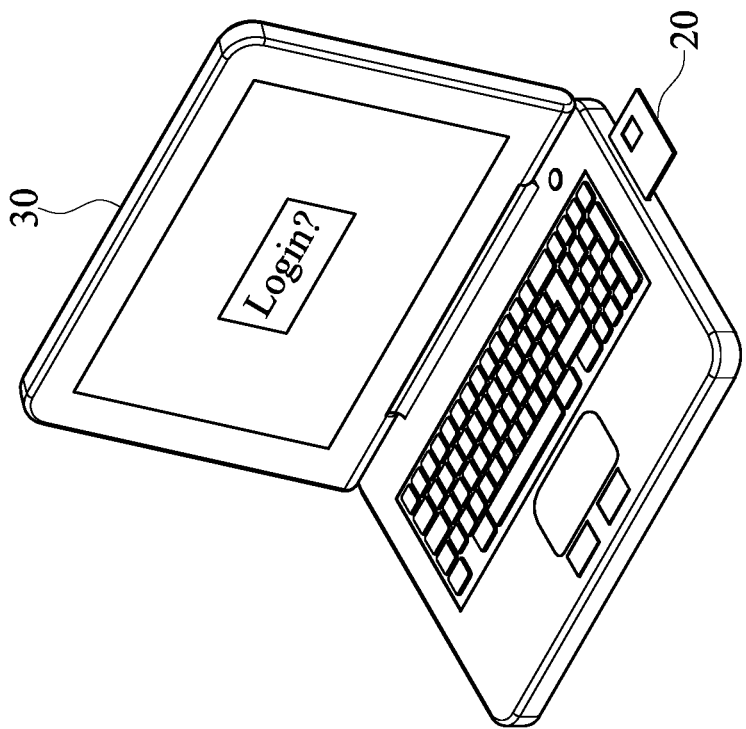
FIG. 3 is a schematic diagram showing the multi-functional authentication apparatus under a certain scenario.

Referring to FIG. 3, a scenario using the multi-functional authentication apparatus according to the present disclosure is shown.

The multi-functional authentication apparatus 20 becomes an authentication apparatus used for logging on a computer device 30 when it plugs in the computer device 30 via the data interface, e.g. USB interface. When a user initiates a biometric authentication process, the multi-functional authentication apparatus scans the user's biometric feature, e.g. fingerprint. The biometric feature is used to generate the security code. The security code is transmitted to the computer device 30 via the data interface. The user can successfully log in the computer system after passing the identity authentication with the biometric feature.

Figure 4:
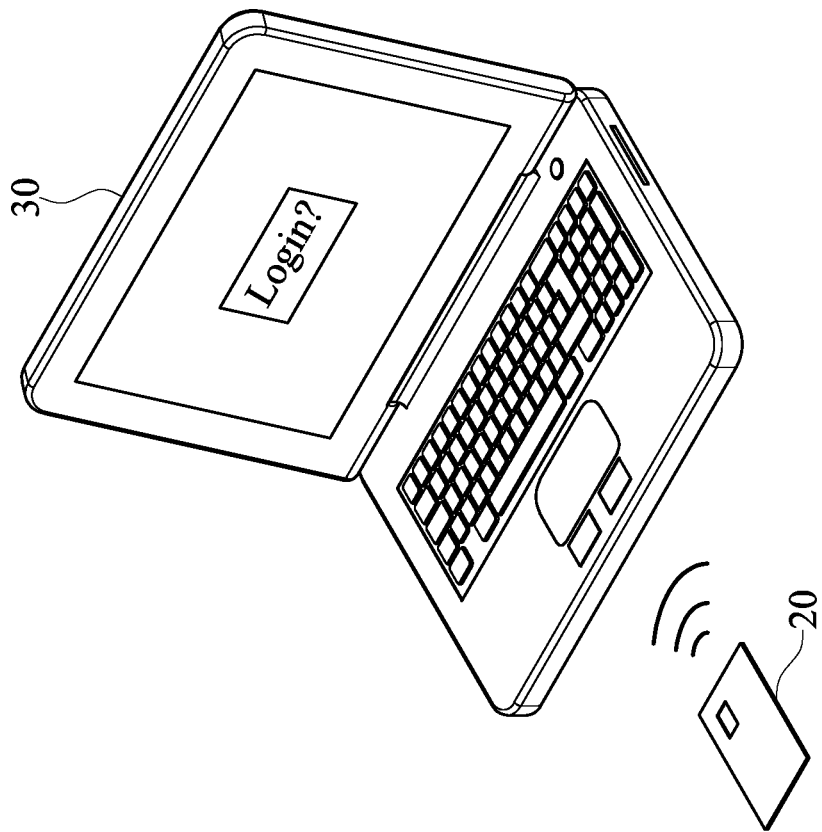
FIG. 4 is another schematic diagram showing the multi-functional authentication apparatus under another scenario.

FIG. 4 shows another schematic diagram of a scenario where the multi-functional authentication apparatus 20 uses a wireless communication technology to perform the biometric authentication. A wireless communication protocol is used to transmit the hashed security code to the computer device 30. In the computer device 30, the security code is encrypted for authentication. The user can log in the computer system, access data, executes software, and/or obtain a network service after passing the identity authentication process.

Moreover, the multi-functional authentication apparatus can be used to connect and open an access control device. When the apparatus connects with a system of the access control device, the access control device can be successfully opened if a security authentication process has been performed.

Further, the multi-functional authentication apparatus can be used as an authentication apparatus for processing a payment procedure.

Figure 5:
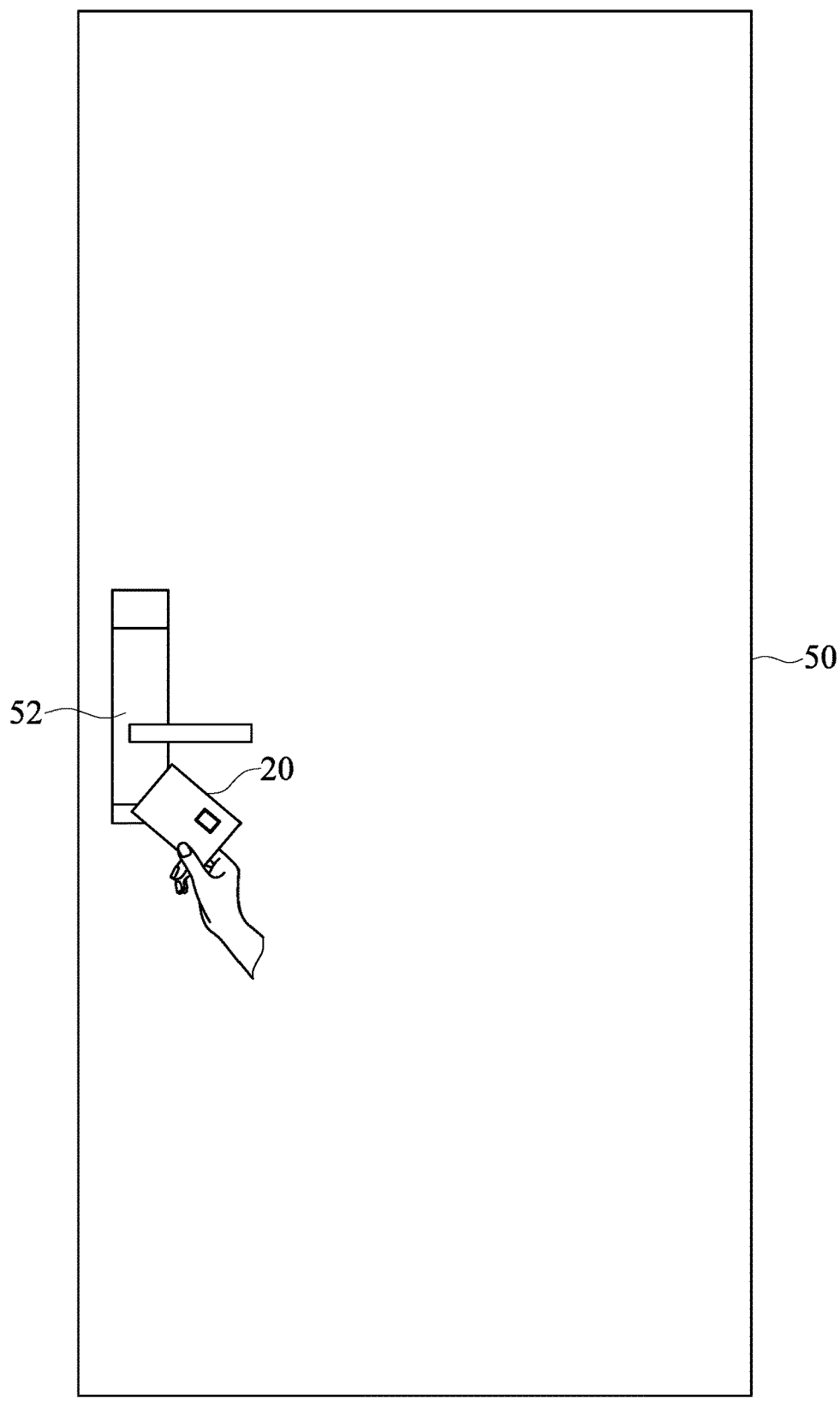
FIG. 5 is one further schematic diagram showing the multi-functional authentication apparatus under yet another scenario.

Reference is made to FIG. 5 showing another schematic diagram in a scenario where a multi-functional authentication apparatus 20 is used to open an access control device. The access control device is such as a gate 50 disposed with a gate lock 52. The gate lock 52 includes a host that is configured to be paired with the multi-functional authentication apparatus 20. When a user uses the multi-functional authentication apparatus 20 to conduct biometric authentication, the multi-functional authentication apparatus 20 transmits a security code to the host of the gate lock 52 under a wireless communication protocol. The wireless communication there-between is performed in compliance with a Near-Field Communication (i.e. NFC) protocol. A software process running in the host of the gate lock 52 conducts the identity authentication. The gate 50 associated with the gate lock 52 is opened after the identity authentication. The multi-functional authentication apparatus 20 can also be applied to other access control devices, e.g. a gate of a parking lot, an elevator, or any gate requiring access control.

Figure 6:
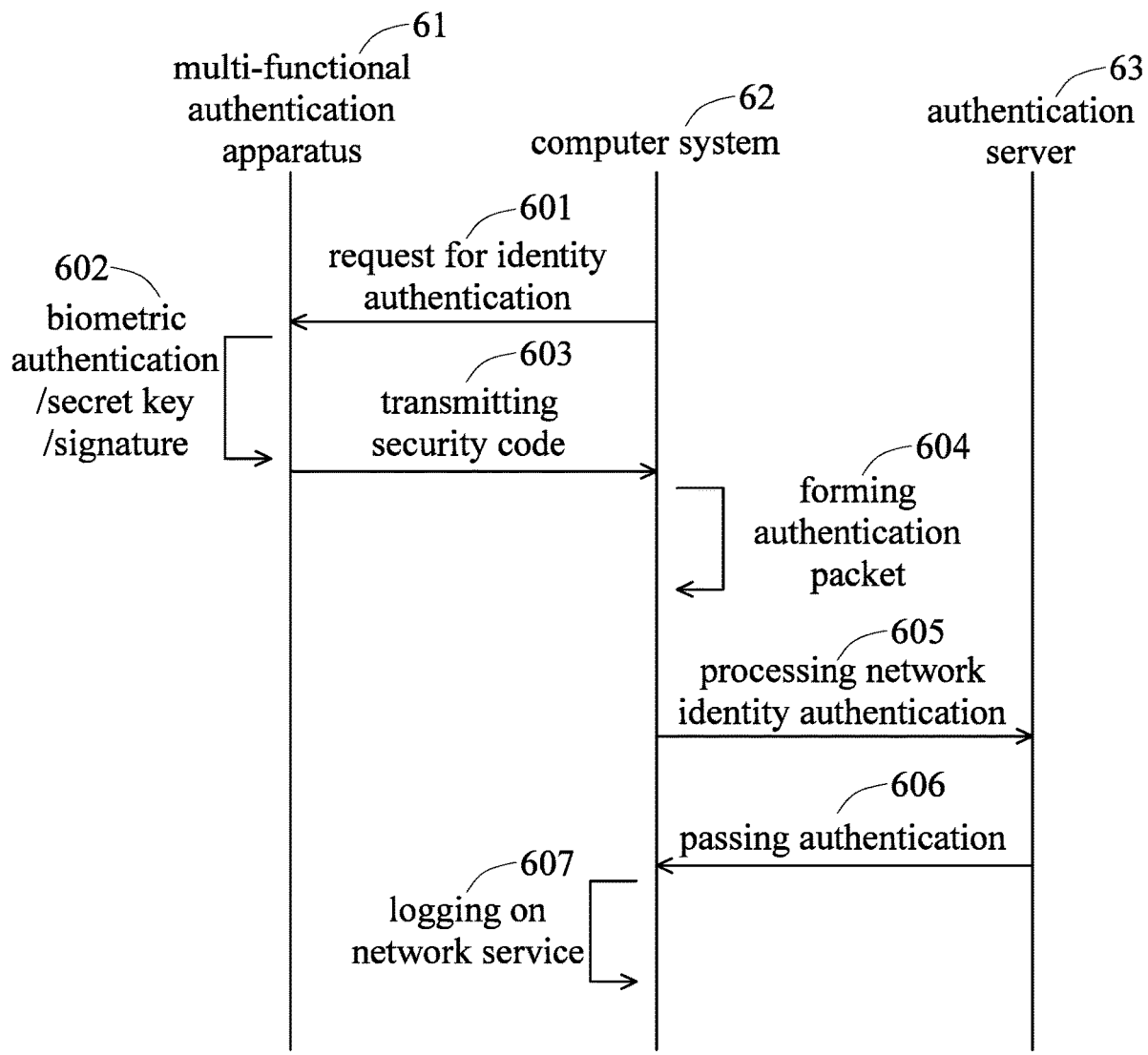
FIG. 6 is a flow chart describing the process of logging on a network device using the multi-functional authentication apparatus according to one embodiment of the disclosure.

FIG. 6 shows a flow chart describing a process for logging on a network service using the multi-functional authentication apparatus according to one embodiment of the present disclosure. The process is operated among a multi-functional authentication apparatus 61, a computer system 62 and an authentication server 63.

In the present application, the multi-functional authentication apparatus supports a Fast Identity Online, e.g. FIDO2. It should be noted that FIDO2 is constituted of a Client-to-Authenticator Protocol (CTAP) of FIDO and a Web Authentication (WebAuthn) specification announced by World Wide Web Consortium (W3C).

In practice, an Application Programming Interface (API) used for web authentication in the authentication server 63 is embedded in a web browser running in the computer system 62. The API allows the web browser to access a specific service through FIDO/FIDO2. The CTAP allows the multi-functional authentication apparatus 61 to process identity authentication with the computer system 62 via USB, Bluetooth communication protocol or NFC while accessing the network service.

In the beginning, as shown in the diagram, the computer system 62 requires identity authentication for accessing a network service via a web browser (step 601). The multi-functional authentication apparatus 61 activates one authentication process with the computer system 62. For example, a biometric authentication process is activated in the multi-functional authentication apparatus 61 (step 602) for producing a biometric feature by a biometric module of the apparatus 61. A security authentication module (202, FIG. 2) of the multi-functional authentication apparatus 61 is used to calculate a hash value. An encryption key is used to create a digital signature. The digital signature becomes a security code for the computer system 62 (step 603). The security code is then encrypted by a corresponding software program running in the computer system 62 for forming authentication packets (step 604).

In an exemplary example, when the computer system 62 receives the security code, a public key is used to decrypt the code for obtaining the hash value calculated from the biometric feature. The hash value acts as a key for authentication.

In CTAP, the computer system 62 uses a program corresponding to the authentication server 63 to process network identity authentication with the external authentication server 63 through the authentication data based on the security code (step 605). By an authentication process running in the authentication server 63, the hash value is compared with a registered identity data. If the authentication succeeds (step 606), the network service can be accessed successfully (step 607). Thus, the multi-functional authentication apparatus 61 allows the computer system 62 that supports FIDO/FIDO2 to process the identity authentication more conveniently and safely for accessing the network service.

Figure 7:
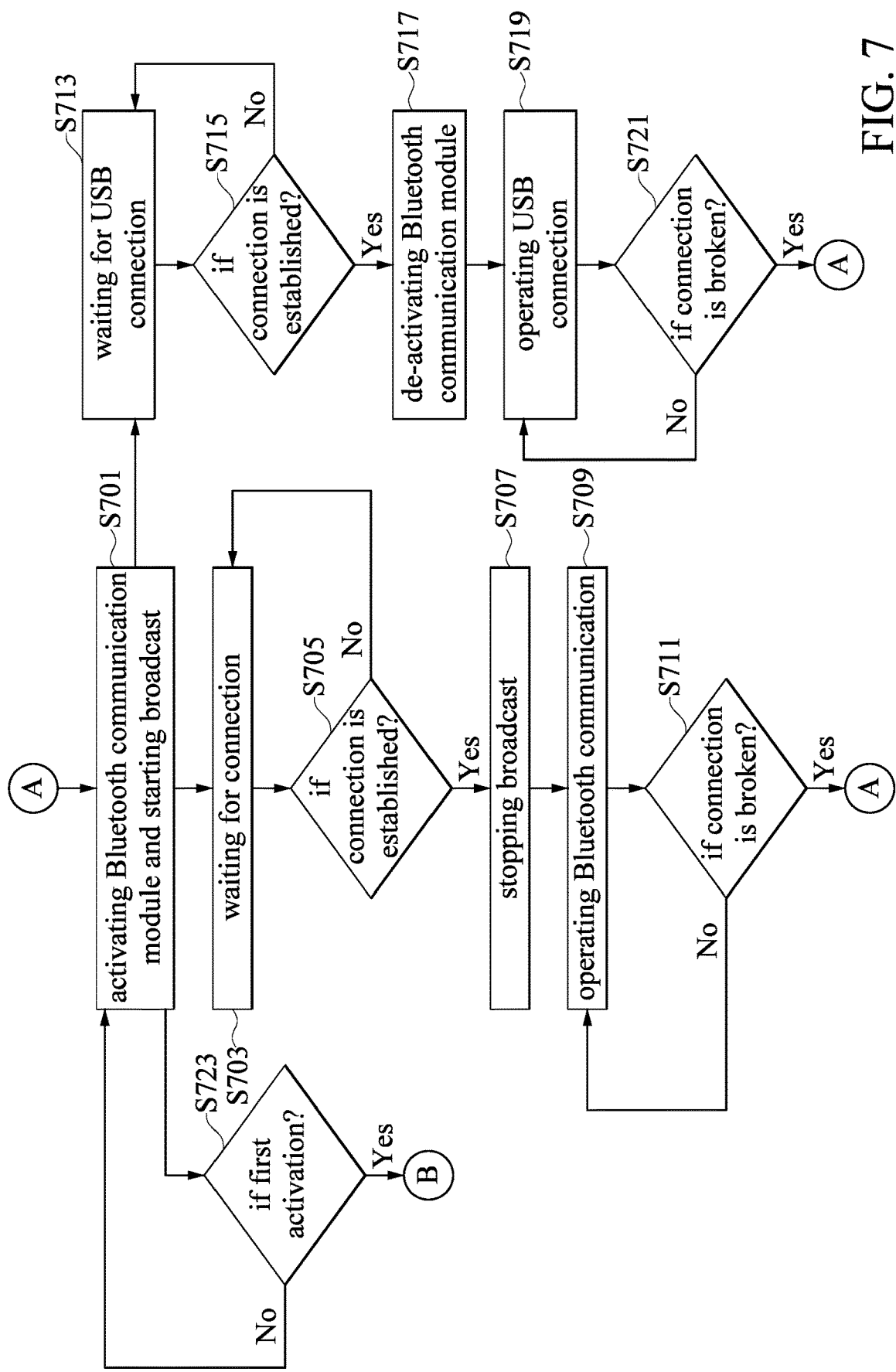
FIG. 7 is a flow chart describing an operating method of the multi-functional authentication apparatus in one embodiment of the disclosure.

Since the multi-functional authentication apparatus supports various communication technologies and authentication methods, a connection protocol is particularly set when the apparatus is in operation. A micro-controller unit of the apparatus operates the main authentication process. FIG. 7 shows a flow chart that describes an embodiment of the process of the multi-functional authentication apparatus.

In the beginning, the multi-functional authentication apparatus may be in an off state before the process of FIG. 7. Referring to the process C shown in FIG. 9, in step S901, the multi-functional authentication apparatus is initially turned off. In step S903, the multi-functional authentication apparatus is ready to be launched. If the multi-functional authentication apparatus is not connected with any external host via any bus, e.g. USB, or turned on by touching/clicking a power switch interface, step S903 is repeated. Once the multi-functional authentication apparatus is turned on, in step S905, the apparatus is activated to perform the process A shown in FIG. 7.

FIG. 7 shows a main process A according to one embodiment of the present disclosure. In step S701, the multi-functional authentication apparatus is turned on by touching/clicking the power switch interface. In the meantime, a first wireless communication module, e.g. Bluetooth communication module, is preset in advance to be activated. The first wireless communication module starts to broadcast packets for pairing with other devices and awaits to be paired (step S703). In step S705, the software process operated in the apparatus determines whether or not any pairing has succeeded. If no paired device is found, step S703 is repeated. Otherwise, the first wireless communication module stops broadcasting, such as in step S707, if the multi-functional authentication apparatus is successfully paired with a device by the first wireless communication module.

In step S709, the multi-functional authentication apparatus starts to operate the first wireless communication protocol for processing instructions under a corresponding first wireless communication protocol, e.g., Bluetooth communication protocol. A software process running in the device determines whether or not the connection is broken at any time (step S711). If the connection has been broken, step S709 is repeated; otherwise, the process goes back to the initial step if the connection is broken.

In another procedure of the process A, the multi-functional authentication apparatus is turned on by touching/clicking the power switch, and the power switch interface receives a trigger signal. The first wireless communication module is activated and operated under the first wireless communication protocol. In step S713, a software process in the multi-functional authentication apparatus awaits connection with a host via the data interface of the bus module. In step S715, the software process in the apparatus determines whether or not to connect with the host via the data interface. If the connection is not established, steps S713 and S715 are repeated. Once the multi-functional authentication apparatus is connected with the host via the data interface, related data is generated. In step S717, in accordance with the connection protocol, the first wireless communication module is de-activated by the software process running in the apparatus. In step S719, the apparatus operates a communication protocol corresponding to the bus module for processing the instructions and data under this protocol. The software process running in the apparatus also determines if the connection is broken at any time (step S721). Similarly, the step S719 is repeated if the connection maintains; otherwise, the process goes back to the beginning of process A if the connection is found to be broken.

On the other hand, in step S723, the first wireless communication module is also activated when the multi-functional authentication apparatus is turned on. The software process operated in the multi-functional authentication apparatus determines whether or not the apparatus is activated for the first time. If it is not the first time that the apparatus is activated, the process goes back to the beginning step S701 of the process A. If it is the first time that the apparatus is activated, the process will proceed to the process B described in FIG. 8. It should be noted that the first-time activation of the multi-functional authentication apparatus can be a situation where the apparatus does not conduct any process after the apparatus is turned on.

Figure 8:
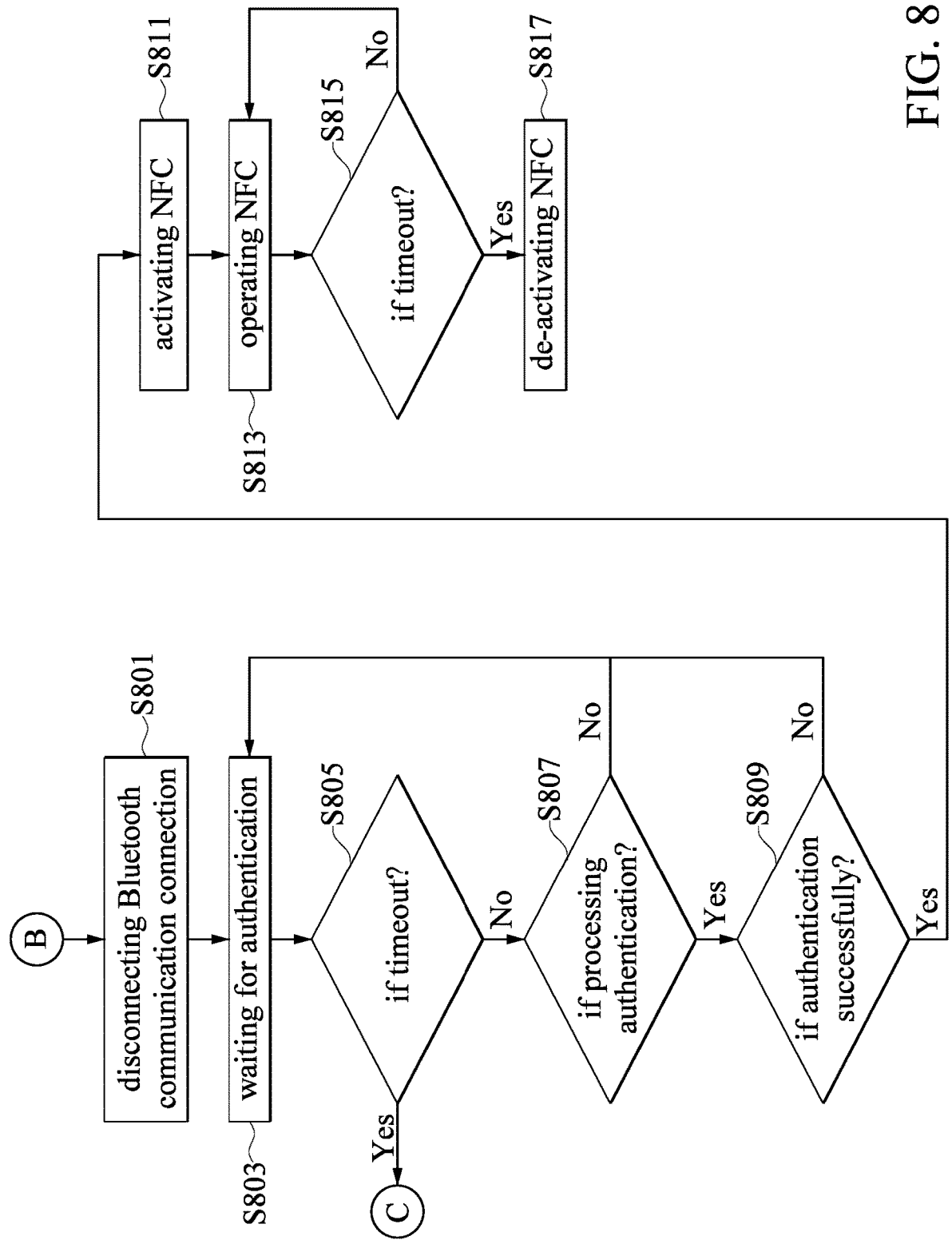
FIG. 8 is another flow chart describing the operating method of the multi-functional authentication apparatus in another embodiment of the disclosure.

The process B of the operating method for the multi-functional authentication apparatus is referred to FIG. 8.

In the beginning of process B, a process of identity authentication, i.e. a biometric authentication procedure, is performed when the multi-functional authentication apparatus is activated. In the meantime, such as in step S801, the Bluetooth communication is de-activated, and an identity authentication process is performed for awaiting an authentication action, such as in step S803. A timer starts timing at the same time. A software process running in the apparatus determines if a timeout has occurred as compared with a time threshold (step S805). If the identity authentication process is timed out, the process goes to process C of FIG. 9 according to the connection protocol. If the identity authentication process is not timed out, such as in step S807, the software process in the apparatus determines if the authentication process is in operation; if the authentication process is not in operation, the process performs the steps S803 and S805 for awaiting identity authentication and determining if a timeout has occurred.

When the authentication process is in operation, such as in step S809, the process determines if the authentication is completed. If the authentication fails, step S803 is returned to, where a re-authentication is requested. If the authentication succeeds, the second wireless communication module, e.g. NFC module, is activated according to the connection protocol (step S811). The second wireless communication module is then operated under a specific communication protocol for processing the related instructions (step S813).

In step S815, the software process running in the apparatus determines if the operation of the second wireless communication module is timed out when compared with another time threshold. The step S813 is still processed if a timeout does not occur. Otherwise, if a timeout has occurred, the second wireless communication module is driven to be de-activated or to enter a sleep mode (step S817). It should be noted that the timeout event indicates that the second wireless communication module does not finish any operation, or has already finished a specific job. The timeout mechanism allows the apparatus to drive the module to a sleep mode or to be de-activated.

Figure 9:
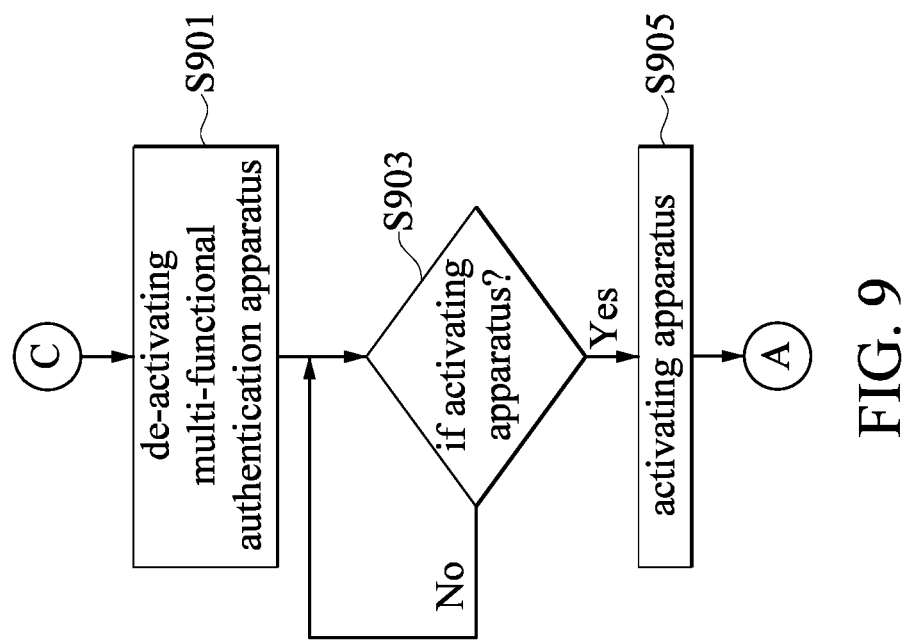
FIG. 9 is yet another flow chart describing the operating method of the multi-functional authentication apparatus in one further embodiment of the disclosure.

FIG. 9 shows the process C of the operating method for the multi-functional authentication apparatus in one embodiment of the present disclosure. The multi-functional authentication apparatus is in an off state in the step S901 of the process C. It should be noted that the off state indicates that the multi-functional authentication apparatus is turned off actively, or is in off/sleep mode after a timeout. In step S903, the multi-functional authentication apparatus is ready to be turned on while awaiting connection with an external host via USB, or touching/clicking a power switch interface of the apparatus. When the multi-functional authentication apparatus is turned on in either of the two ways, such as in step S905, the apparatus performs the process A of FIG. 7.

In sum, according to the above embodiments, the provided multi-functional authentication apparatus supports various communication technologies for connecting with a host since the apparatus integrates multiple communication modules. The apparatus acts as an authentication device integrating several functions of security authentication. A biometric authentication procedure is particularly one of the authentication processes running in the multi-functional authentication apparatus in order to replace the traditional security measures. A connection protocol is provided for the multi-functional authentication apparatus to select one of the communication modules to connect with the host for conducting identity authentication.

Therefore, the multi-functional authentication apparatus is applicable to various applications that require identity authentication, for example, unlocking a lock of a gate, activating a mobile device, logging on a cloud service, verifying a payment/mobile payment in a transaction procedure, and initiating a payment procedure while connected with a host. For authenticating the payment procedure, the payment is made after the security authentication conducted by the multi-functional authentication apparatus is passed.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for operating a multi-functional authentication apparatus, comprising:
   activating a multi-functional authentication apparatus;
   performing a biometric authentication procedure through a security authentication module;
   generating a security code after completely reading biometric feature;
   using one of a plurality of communication modules of the multi-functional authentication apparatus to connect with a host according to a connection protocol; and
   transmitting the security code to the host via the communication module connected with the host so as to perform identity authentication;
   wherein the plurality of communication modules of the multi-functional authentication apparatus includes a bus module; the multi-functional authentication apparatus is activated by a power management module when using a data interface of the bus module to connect with the host;
   wherein the plurality of communication modules of the multi-functional authentication apparatus include a first wireless communication module, the first wireless communication module activates when the multi-functional authentication apparatus is removed from the host according to the connection protocol, and then starts broadcasting connection packets; the security code is transmitted to the host via the first wireless communication module when paired with the host.

2. The method according to claim 1, wherein the security code is compiled and transmitted to the host via the data interface.

3. The method according to claim 1, wherein the plurality of communication modules of the multi-functional authentication apparatus include a second wireless communication module that is activated when the first wireless communication module is de-activated according to the connection protocol, and the security code is transmitted to the host via the second wireless communication module.

4. The method according to claim 3, wherein, when the first wireless communication module is not connected with the host for a period of time that exceeds a time threshold, the first wireless communication module is de-activated; when the first wireless communication module is in operation, the first wireless communication module is de-activated when the multi-functional authentication apparatus receives a trigger signal through a power switch.

5. The method according to claim 1, wherein, when the multi-functional authentication apparatus receives a trigger signal through a power switch interface, the multi-functional authentication apparatus is activated by a power management module.

6. The method according to claim 5, wherein the plurality of communication modules includes a first wireless communication module and a second wireless communication module; the first wireless communication module is activated and starts broadcasting connection packets when the multi-functional authentication apparatus is activated; the first wireless communication module is used to transmit the security code to the host when paired with the host.

7. The method according to claim 6, wherein the second wireless communication module that is activated for transmitting the security code to the host when the first wireless communication module is de-activated.

8. The method according to claim 7, wherein, when the first wireless communication module is not connected with the host for a period of time that exceeds a time threshold, the first wireless communication module is de-activated; when the first wireless communication module is in operation, the first wireless communication module is de-activated when the multi-functional authentication apparatus receives a trigger signal through a power switch.

9. The method according to claim 1, wherein, if the multi-functional authentication apparatus connects with the host for logging into a computer system, the multi-functional authentication apparatus logs into the computer system after completing the security authentication; if the multi-functional authentication apparatus connects with the host for executing a software program, the software program is successfully executed after completing the security authentication; if the multi-functional authentication apparatus connects with the host for accessing a file, the file is successfully accessed after completing the security authentication; if the multi-functional authentication apparatus connects with the host for unlocking an access control device, the access control device is successfully accessed when completing the security authentication; and if the multi-functional authentication apparatus connects with the host for initiating a payment procedure, the payment is completed when completing the security authentication.

10. The method according to claim 9, wherein, when the biometric feature is obtained, a hash value for the biometric feature is calculated, and an encryption key in the security authentication module is incorporated to perform an encryption algorithm on the hash value for generating the security code.

11. A multi-functional authentication apparatus, performing the method for operating the multi-functional authentication apparatus according to claim 1, wherein the apparatus comprises:
  a micro-controller unit used to control operations of a plurality of circuit modules of the multi-functional authentication apparatus;
  a plurality of communication modules electrically connected with the micro-controller unit, comprising:
    a bus module with a data interface used to connect with a host;
    a first wireless communication module that connects with the host under a first wireless communication protocol; and
    a second wireless communication module that connects with the host under a second wireless communication protocol;
  a biometric module electrically connected with the micro-controller unit and reading biometric features via a biometric feature access interface;
  a security authentication module, electrically connected with the micro-controller unit, obtaining biometric feature generated by the biometric module by the micro-controller unit so as to generate a security code for authentication; and
  a power management module electrically connected with the micro-controller unit and used to control a power supplied to the multi-functional authentication apparatus.

12. The apparatus according to claim 11, wherein the biometric module is a fingerprint recognition module that uses the biometric feature access interface disposed on a surface of the multi-functional authentication apparatus to read a fingerprint image.

13. The apparatus according to claim 11, wherein the first wireless communication module is a Bluetooth communication module, and the second wireless communication module is a near-field communication module.

14. The apparatus according to claim 13, wherein the Bluetooth communication module is a dual-mode communication chip that operates under a Bluetooth communication protocol or a Bluetooth low energy protocol.

15. The apparatus according to claim 11, wherein the security authentication module includes a security chip having a memory that stores an encryption key and biometric feature used for comparison.

16. The apparatus according to claim 15, when the biometric feature is obtained, a hash value for the biometric feature is calculated, and an encryption key in the security authentication module is incorporated to perform an encryption algorithm on the hash value for generating the security code.

17. The apparatus according to claim 11, wherein the multi-functional authentication apparatus is a card-type device that includes an internal battery module that supplies power to the multi-functional authentication apparatus by the power management module.

18. The apparatus according to claim 17, wherein the multi-functional authentication apparatus uses one of the plurality of communication modules to connect with the host according to a connection protocol, wherein:
  the first wireless communication module is de-activated when the multi-functional authentication apparatus connects with the host via the data interface according to the connection protocol;
  the first wireless communication module is activated when the multi-functional authentication apparatus is removed from the host according to the connection protocol, wherein the first wireless communication module starts broadcasting connection packets when pairing the host, and wirelessly transmits the security code to the host via the first wireless communication module;
  the second wireless communication module is activated when the first wireless communication module is de-deactivated according to the connection protocol, so as to transmit the security code to the host via the second wireless communication module.

* * * * *